(12) United States Patent
Warnecke et al.

(10) Patent No.: US 12,513,486 B2
(45) Date of Patent: *Dec. 30, 2025

(54) HEAD-RELATED TRANSFER FUNCTION DETERMINATION USING REFLECTED ULTRASONIC SIGNAL

(71) Applicant: META PLATFORMS TECHNOLOGIES, LLC, Menlo Park, CA (US)

(72) Inventors: Michaela Warnecke, Somerville, MA (US); Pablo Francisco Faundez Hoffmann, Kenmore, WA (US); Vamsi Krishna Ithapu, Kirkland, WA (US); Sebastian-Teodor Prepeliță, Seattle, WA (US); Philip Robinson, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 1223 days.

This patent is subject to a terminal disclaimer.

(21) Appl. No.: 17/220,588

(22) Filed: Apr. 1, 2021

(65) Prior Publication Data

US 2022/0322028 A1    Oct. 6, 2022

(51) Int. Cl.
  *H04S 7/00*  (2006.01)
  *G06T 19/00*  (2011.01)

(52) U.S. Cl.
  CPC .............. *H04S 7/40* (2013.01); *G06T 19/006* (2013.01); *H04S 2420/01* (2013.01)

(58) Field of Classification Search
  CPC ........ H04S 7/40; H04S 2420/01; H04S 7/301; G06T 19/006
  USPC ............................................................. 367/7
  See application file for complete search history.

(56) References Cited

U.S. PATENT DOCUMENTS 10,932,083 B2 *   2/2021  Brimijoin, II  .........  H04R 5/033

* cited by examiner

*Primary Examiner* — Daniel L Murphy
(74) *Attorney, Agent, or Firm* — Greenberg Traurig, LLP

(57) ABSTRACT

An audio system includes a plurality of transducers, one or more acoustic sensors, and a controller. The plurality of transducers transmits an ultrasonic beam towards an ear of a user. The one or more acoustic sensors detect a reflected signal generated by an interaction of the ultrasonic beam with the ear. The controller updates a three-dimensional geometry of the ear based on the reflected signal. The controller determines a head-related transfer function (HRTF) for the user based in part on the three-dimensional geometry of the ear.

20 Claims, 6 Drawing Sheets

400

```
Transmit a plurality of ultrasonic beams toward an ear of a user
410
                              ↓
Detect a reflected signal generated by an interaction of a portion of the
ultrasonic beams with the ear
420
                              ↓
Update a three-dimensional geometry of the ear based on the reflected signal
430
                              ↓
Determine a head-related transfer function (HRTF) for the user based in part on
the three-dimensional geometry of the ear
440
```

FIG. 4

HEAD-RELATED TRANSFER FUNCTION DETERMINATION USING REFLECTED ULTRASONIC SIGNAL

FIELD OF THE INVENTION

This disclosure relates generally to determining head-related transfer functions (HRTFs), and more specifically to using a reflected ultrasonic signal to determine HRTFs for artificial reality systems.

BACKGROUND

Sound from a given sound source received at two ears can be different, depending on a direction and location of the sound source with respect to each ear. A head-related transfer function (HRTF) characterizes sound received at an ear of a person for a particular location and frequency of the sound source. As such, a personalized HRTF model is used to characterize how a particular individual perceives sound at each ear. Conventional methods for determining an individual's personalized HRTF include selecting a generalized HRTF from a database based on one or more features of the individual and/or inferring a HRTF based on one or more captured images of the individual. The conventional methods are error-prone and may yield a HRTF for the individual that is not truly personalized to the individual. For example, neither method may capture a true geometrical description of the individual's ears as neither method does an adequate job capturing information about one or more obstructed portions of the individual's ears that affect how sound is received at the ears.

Sound propagation from a plurality of transducers of a headset, such as an artificial reality headset, to an individual's ears can vary based on the geometry of the user's ears and/or head. For example, differences in ear size and shape can affect the sound (e.g., audio content) generated by the headset and perceived by the individual, which can negatively impact the individual's audio experience. Conventional methods used by audio systems of headsets are insufficient for delivering high-fidelity audio content as they may not consider variation in ear geometries from individual to individual.

SUMMARY

An audio system is configured to scan a portion of a head of a user of a headset. The scan includes at least an ear of the user and provides the audio system with a means to determine a personalized head-related transfer function (HRTF) for the user. The audio system includes a transducer array that transmits a sound (e.g., an ultrasonic beam and/or a sub-ultrasonic beam) at the portion of the head of the user. The audio system includes a plurality of acoustic sensors that detect a reflected signal from the portion of the head. A controller of the audio system updates a three-dimensional (3D) geometry of the ear of the user based on the reflected signal. The controller determines the personalized HRTF for the user based in part on the 3D geometry of the ear. In some embodiments, the updated 3D geometry of the ear is based on the reflected signal and one or more captured images of the portion of the head of the user. In some embodiments, the updated 3D geometry of the ear may be utilized by the controller to predict how audio content transmitted by the transducer array will sound at the ear of the user. Based on a difference between a target response and a predicted response at the ear of the user, an equalization filter is generated for the user. The equalization filter adjusts one or more acoustic parameters of the audio content (e.g., wavelength, frequency, volume, pitch, balance, etc.) to generate the target response at the ear of the user so that the user perceives the audio content as a content creator of the audio content intended it to be heard.

In one embodiment, a method for determining a HRTF for a user is disclosed. The method comprises transmitting an ultrasonic beam towards an ear of a user of a headset. The method further comprises detecting a reflected signal generated by an interaction of the ultrasonic beam with the ear. The method further comprises updating a 3D geometry of the ear based on the reflected signal by a controller. The method further comprises determining the HRTF for the user based in part on the 3D geometry of the ear by the controller.

In another embodiment, an audio system is disclosed for determining a HRTF for a user. The audio system comprises a plurality of transducers, one or more acoustic sensors, and a controller. The plurality of transducers is configured to transmit an ultrasonic beam towards an ear of the user. The one or more acoustic sensors are configured to detect a reflected signal generated by an interaction of the ultrasonic beam with the ear. The controller is configured to update a 3D geometry of the ear based on the reflected signal. The controller is further configured to determine the HRTF for the user based in part on the 3D geometry of the ear. In some embodiments, the audio system is integrated into a headset worn by the user.

In another embodiment, a non-transitory computer readable medium is disclosed that stores instructions that, when executed by a processor, cause the processor to perform steps comprising transmitting an ultrasonic beam towards an ear of a user of a headset, detecting a reflected signal generated by an interaction of the ultrasonic beam with the ear, updating a 3D geometry of the ear based on the reflected signal, and determining a HRTF for the user based in part on the 3D geometry of the ear.

BRIEF DESCRIPTION OF THE DRAWINGS

FIG. 4 is a flowchart illustrating a process for determining a head-related transfer function for a user, in accordance with one or more embodiments.

Figure 1A:
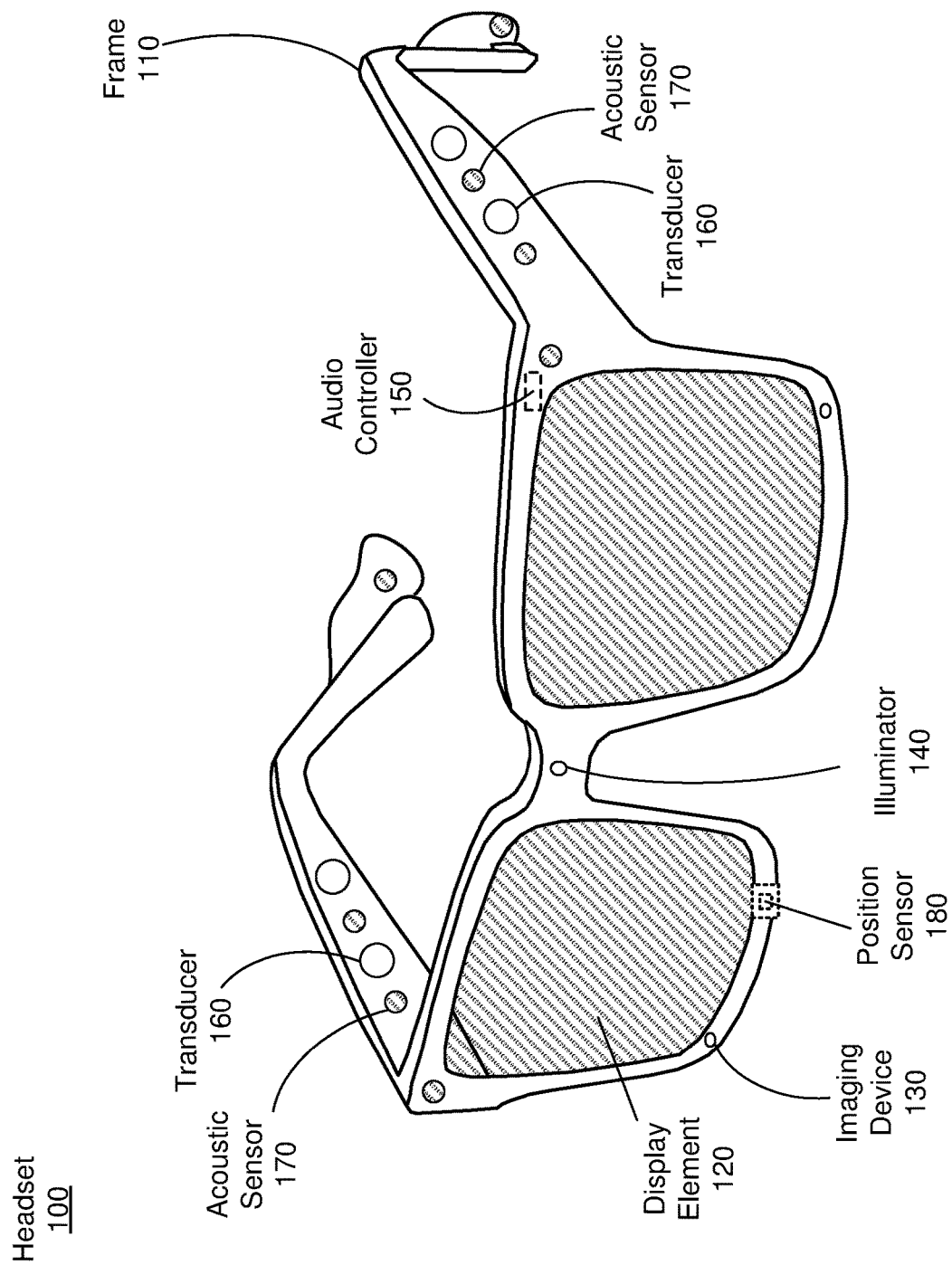
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system of a headset includes a plurality of transducers, a plurality of acoustic sensors, and a controller. The audio system is configured to determine a HRTF for a user of the headset based on a reflected signal. The plurality of transducers transmits a plurality of ultrasonic beams and/or a plurality of sub-ultrasonic beams towards an ear of the user. The ear includes an outer ear, a middle ear, and an inner ear. The plurality of acoustic sensors detects the reflected signal that is generated by an interaction between the ultrasonic beams and/or the sub-ultrasonic beams and the ear of the user. The interaction creates the reflected signal according to a geometry of a surface of the outer ear and/or a surface of the ear in between the outer ear and the middle ear (e.g., a surface of an ear canal leading from the outer ear to the middle ear and/or a surface of a tympanic membrane that divides the outer ear from the middle ear). For example, a surface that the ultrasonic beams interact with to generate the reflected signal may be a surface of the outer ear. In another example, the sub-ultrasonic beams may interact with a surface of the outer ear and/or a surface of the ear in between the outer ear and the middle ear (e.g., an ear canal) that is typically obstructed from a line-of-sight of the transducers. For example, an interior surface of the ear canal typically obstructed by a tragus and/or the ear canal's own curved structure may interact with the sub-ultrasonic beams and generate a reflected signal. In another example, the sub-ultrasonic beams may interact with surfaces of the outer ear typically obstructed by one or more pinna folds (such as, a surface of the outer ear underneath the crus helix) to generate a reflected signal.

Based upon the reflected signal, the audio system updates a three-dimensional (3D) geometry of the ear. The 3D geometry may be based on one or more captured images of the ear, depth information about the ear, the reflected signal, or some combination thereof. The audio system may determine the 3D geometry of the ear and include areas of low confidence. The areas of low confidence may be updated based on the reflected signal. In some embodiments, the audio system updates the 3D geometry by inputting a first 3D geometry and a second 3D geometry into a machine learning model. The machine learning model is trained to update the 3D geometry of the ear based on the inputs. For example, the first 3D geometry may be based on one or more captured images and/or depth information and the second 3D geometry may be based on the reflected signal. The machine learning model method is useful for combining the 3D geometries by, for example augmenting a low confidence area of one 3D geometry (e.g., an area that corresponds to a portion of the ear that includes an obstructed surface) with a corresponding area of the other 3D geometry.

The audio system determines a personalized HRTF for the user based on the updated 3D geometry of the ear. In some embodiments, the audio system presents audio content to the user based on the personalized HRTF that is highly spatialized. The audio system determines an equalization filter based on the updated 3D geometry of the ear. The equalization filter adjusts one or more acoustic parameters of the audio content (e.g., wavelength, frequency, volume, pitch, balance, other spectral content, acoustic time delay, etc.) presented to the user. In some embodiments, the audio system applies the equalization filter to the audio content prior to presenting the audio content to the user. The equalization filter, when applied to the audio content, adjusts the audio content to a target response at the ear of the user so that the user perceives the audio content as a content creator of the audio content intended it to be heard.

Conventional methods for determining an individual's HRTF(s) may include an algorithmic generalization of publicly available HRTF data from a variety of databases. For example, certain characteristics of the individual (e.g., gender, age, etc.) are matched to characteristics in a database and corresponding HRTFs are selected for the individual. Another conventional method may include capturing one or more images of an ear of the individual and, through the use of computer vision algorithms, ear geometry of the individual may be determined. The determined geometry may be compared to known geometries in a database and corresponding HRTFs are selected for the individual. However, large portions of an outer ear and large portions of the ear between the outer ear and middle ear of the individual are not considered using either conventional method. The publicly available HRTF data does not take into consideration the ear geometry of the individual who is to be matched with corresponding HRTFs. The HRTFs that correspond to geometries determined based on one or more images do not take into consideration one or more areas of the ear obstructed from view of the imaging device. The method of determining an individual's HRTF(s) described herein considers these areas of the ear. For example, by using acoustic cues received from an individual's ear, large portions of the contours and morphology of the outer ear (e.g., pinna, concha, tragus, etc.), interior structures of the ear canal, and/or structures of the tympanic membrane may be determined resulting in more accurate (and more personalized) HRTF determination for the individual.

Also, the highly accurate ear geometries determined using the method disclosed herein are used to determine an individualized equalization filter for the individual. Conventional methods for determining the equalization filter involve placing a microphone at the entrance to the individual's ear canal to measure a raw response of the presented audio content. Practical application of this approach in a headset design leads to challenges in the industrial design in terms of comfort and aesthetics and also in the individual's experience in terms of ease of use. Instead, the highly accurate ear geometries determined using the method disclosed herein are determined in a less invasive way (e.g., no microphones are placed at the entrance of the individual's ear canal) and current industrial headset designs that include transducers on the frame do not need to be altered for the ear geometries and equalization filter to be determined.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 110, and may include, among other components, a display assembly including one or more display elements 120, a depth camera assembly (DCA), an audio system, and a position sensor 180. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of the local area surrounding the headset 100. The DCA includes one or more imaging devices 130 and a DCA controller (not shown in FIG. 1A) and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA may capture one or more images of the user. For example, the one or more imaging devices 130 of the DCA may be used to capture one or more images of a portion of the user. The portion of the user may include an ear of the user, a portion of a head of the user, a portion of a shoulder of the user, or a combination thereof. The captured one or more images may be a depth image or a color image (e.g., an RGB image). In some embodiments, to capture a portion of the user, the one or more imaging devices 130 may perform a stationary scan of that portion of the user in accordance with instructions from the DCA controller. During a stationary scan, the one or more imagining devices 130 capture one or more images of the portion of the user. The headset 100 remains stationary relative to the head of the user throughout the scan. For example, the headset 100 may be worn by the user during a stationary scan. In another example, the headset 100 may be held away from the user at a single position while the stationary scan is taking place.

The DCA may perform a moving scan to capture a portion of the user. During a moving scan, the user may remove the headset 100 and position it such that the one or more imaging devices 130 are directed towards the user from a plurality of different positions. For example, the user (or some other party) can position the headset 100 in different locations relative to the head of the user, such that the one or more imaging devices 130 capture one or more images of a portion of the head or various portions of the head. Additionally, the user (or some other party) may hold the headset 100 at different angles and/or distances relative to the user. For example, the user may hold the headset 100 at a distance shorter than arm's length with the one or more imaging devices 130 pointed towards a side of the user's head during a moving scan. By holding the headset 100 at different angles, the one or more imaging devices 130 may capture images of portions of a backside of the ear, of portions behind the tragus, etc. In some embodiments, the one or more imaging devices 130 are positioned to capture one or more images of a left ear of the user during a first moving scan and a right ear of the user during a second moving scan.

The DCA controller computes depth information for the portion of the local area using the captured images and one or more depth determination techniques. In some embodiments, the DCA controller computes depth information for the portion of the user using the captured images and one or more depth determination techniques. For example, the DCA controller may compute depth information about various portion of the ear of the user. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

In some embodiments, the one or more imaging devices 130 can capture and provide the one or more images to the audio system for further processing. In some embodiments, the one or more imaging devices 130 can capture and provide the one or more images to a server, a console, or some other external system for further processing.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array transmits sound in accordance with instructions from the audio controller 150. The sound may include an ultrasonic beam (e.g., a high frequency sound signal), a sub-ultrasonic beam (e.g., a sound signal with a frequency below the frequency of the ultrasonic beam), audio content, or any combination thereof. In some embodiments, the transducer array transmits the sound towards an ear of the user of the headset 100. In some embodiments, the transducer array transmits the ultrasonic beam and/or sub-ultrasonic beam towards a portion of the ear of the user of the headset 100. In some embodiments, the transducer array transmits the ultrasonic beam and/or sub-ultrasonic beam by scanning the beam across the ear of the user (e.g., by ensonifying various portions of the ear).

The transducer array includes a plurality of transducers 160. In some embodiments, the plurality of transducers 160 can transmit the ultrasonic and/or sub-ultrasonic beams and detect reflected signals generated by interaction(s) of the beams with a surface. In some embodiments, a subset of transducers transmits the ultrasonic and/or sub-ultrasonic beams and a different subset of transducers detects the reflected signals. In some embodiments, the plurality of transducers 160 can transmit either or both the ultrasonic and/or sub-ultrasonic beams and audio content at a same time. In alternative embodiments, a subset of transducers transmits the ultrasonic and/or sub-ultrasonic beams and a different subset of transducers transmits audio content. In some embodiments, the plurality of transducers 160 can transmit the ultrasonic and/or sub-ultrasonic beams, audio content, and detect the reflected signals. In any of these embodiments, the ultrasonic beams, the sub-ultrasonic beams, and/or the audio content may be directed towards the ear of the user.

The plurality of transducers 160 may form a phased array. The phased array may be on a single chip. In some embodiments, the plurality of transducers 160 may include a transducer with a port. In some embodiments as shown in FIG. 1A, the plurality of transducers 160 may be located on a surface of the frame 110 that faces towards the head of the user wearing the headset 100 (e.g., as shown on the right end piece from a perspective of the user) and/or on a surface of the frame 110 that faces away from the head of the user (e.g., as shown on the left end piece). In some embodiments (not shown), the plurality of transducers 160 may be located on a top surface of the end pieces and/or a bottom surface of the end pieces. In some embodiments, the plurality of transducers 160 may be oriented at various angles on the surfaces of the frame 110 such that the transducers 160 better direct sound towards specific portions of the ear. For example, at least one transducer may be angled to have a better line-of-sight on an entrance of an ear canal. The number and/or locations of transducers 160 may be different from what is shown in FIG. 1A. Additional details regarding location and operation of the transducers 160 is discussed below in connection with FIGS. 2 and 3.

The sensor array detects sound within the local area of the headset 100. In some embodiments, the sensor array detects a reflected signal (e.g., a reflected sound signal) generated by the interaction of the ultrasonic beam and/or sub-ultrasonic beam with an ear of the user. In some embodiments, the sensor array detects sounds emitted from one or more sound sources in the local area (e.g., in a room). In some embodiments, functionality of the sensor array may be performed by the transducer array as described above. The sensor array may include a plurality of acoustic sensors 170. An acoustic sensor 170 detects sound (e.g., the reflected signal, a sound emitted by a sound source, etc.) and converts the detected sound into an electronic format (analog or digital). The acoustic sensors 170 may be acoustic wave sensors, microphones, sound transducers, or similar sensors that are suitable for detecting sounds.

The plurality of acoustic sensors 170 may be located on the surface of the frame 110 that faces towards the head of the user wearing the headset 100 (e.g., as shown on the right end piece from a perspective of the user) and/or on the surface of the frame 110 that faces away from the head of the user (e.g., as shown on the left end piece). In some embodiments (not shown), the plurality of acoustic sensors 170 may be located on the top surface of the end pieces and/or the bottom surface of the end pieces. In some embodiments, an acoustic sensor 170 is located adjacent to a transducer 160. The number and/or locations of acoustic sensors 170 may be different from what is shown in FIG. 1A. For example, the number of acoustic detection locations may be increased to increase the amount of audio information collected and the sensitivity and/or accuracy of the information. The acoustic detection locations may be oriented such that an acoustic sensor 170 is able to detect sounds in a wide range of directions surrounding the user wearing the headset 100. Additional details regarding location and operation of the acoustic sensors 170 is discussed below in connection with FIGS. 2 and 3.

In some embodiments, the plurality of transducers 160 and/or the plurality of acoustic sensors 170 may be located on a protrusion of an end piece of the frame 110. For example, one or more end pieces of the headset 100 may include a protrusion extending down towards an ear canal of the user wearing the headset 100.

The audio controller 150 controls the operation of the audio system. The audio controller 150 provides instructions to the transducer array to emit sound (e.g., to emit an ultrasonic beam). The audio controller 150 processes reflected sound detected by the sensor array and/or the transducer array. For example, the audio controller 150 analyzes a reflected signal generated by an interaction of the emitted sound and a surface of an ear. The audio controller 150 may determine a three-dimensional (3D) geometry of the ear based on a template model of the ear, one or more images of the ear, depth information about the ear, and/or the reflected signal. The audio controller 150 may update the 3D geometry of the ear. The audio controller 150 may comprise a processor and a computer-readable storage medium. The audio controller 150 may be configured to generate direction of arrival (DOA) estimates, determine one or more 3D geometries of an ear of the user, update the one or more 3D geometries of the ear of the user, generate acoustic transfer functions (e.g., array transfer functions and/or head-related transfer functions), track the location of sound sources, form beams in the direction of sound sources, classify sound sources, generate sound filters (e.g., an equalization filter) for the transducers 160, or some combination thereof. Additional details regarding operation of the audio controller 150 is discussed below in connection with FIG. 3.

The position sensor 180 generates one or more measurement signals in response to motion of the headset 100. The position sensor 180 may be located on a portion of the frame 110 of the headset 100. The position sensor 180 may include an inertial measurement unit (IMU). Examples of position sensor 180 include: one or more accelerometers, one or more gyroscopes, one or more magnetometers, another suitable type of sensor that detects motion, a type of sensor used for error correction of the IMU, or some combination thereof. The position sensor 180 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 180 tracks the position (e.g., location and pose) of the headset 100 within the room. Additional details regarding the components of the headset 100 are discussed below in connection with FIG. 6.

Figure 1B:
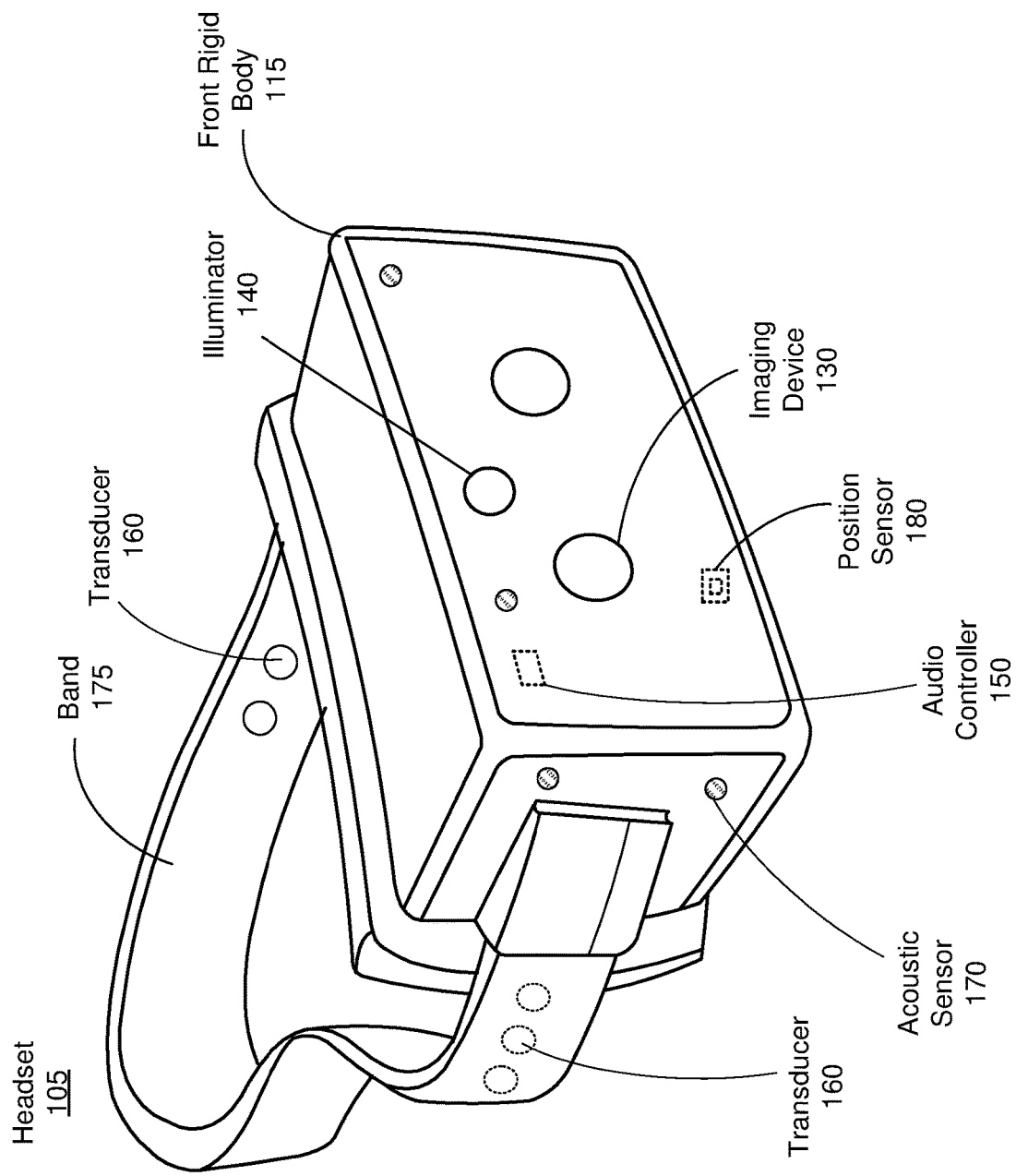
FIG. 1B is a perspective view of a headset implemented as a head-mounted display, in accordance with one or more embodiments.

FIG. 1B is a perspective view of a headset 105 implemented as an HMD, in accordance with one or more embodiments. In embodiments that describe an AR system and/or a MR system, portions of a front side of the HMD are at least partially transparent in the visible band (~370 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A but modified to integrate with the HMD form factor. For example, the HMD includes a display assembly, a DCA, an audio system, and a position sensor 180. FIG. 1B shows a plurality of the imaging devices 130, the illuminator 140, a plurality of the transducers 160, a plurality of acoustic sensors 170, and the position sensor 180. The transducers 160 may be located in various locations, such as coupled to the band 175 (as shown) and/or coupled to the front rigid body 115. The acoustic sensors 170 may be located in various locations, such as coupled to the band 175 or coupled to the front rigid body 115 (as shown).

Figure 2:
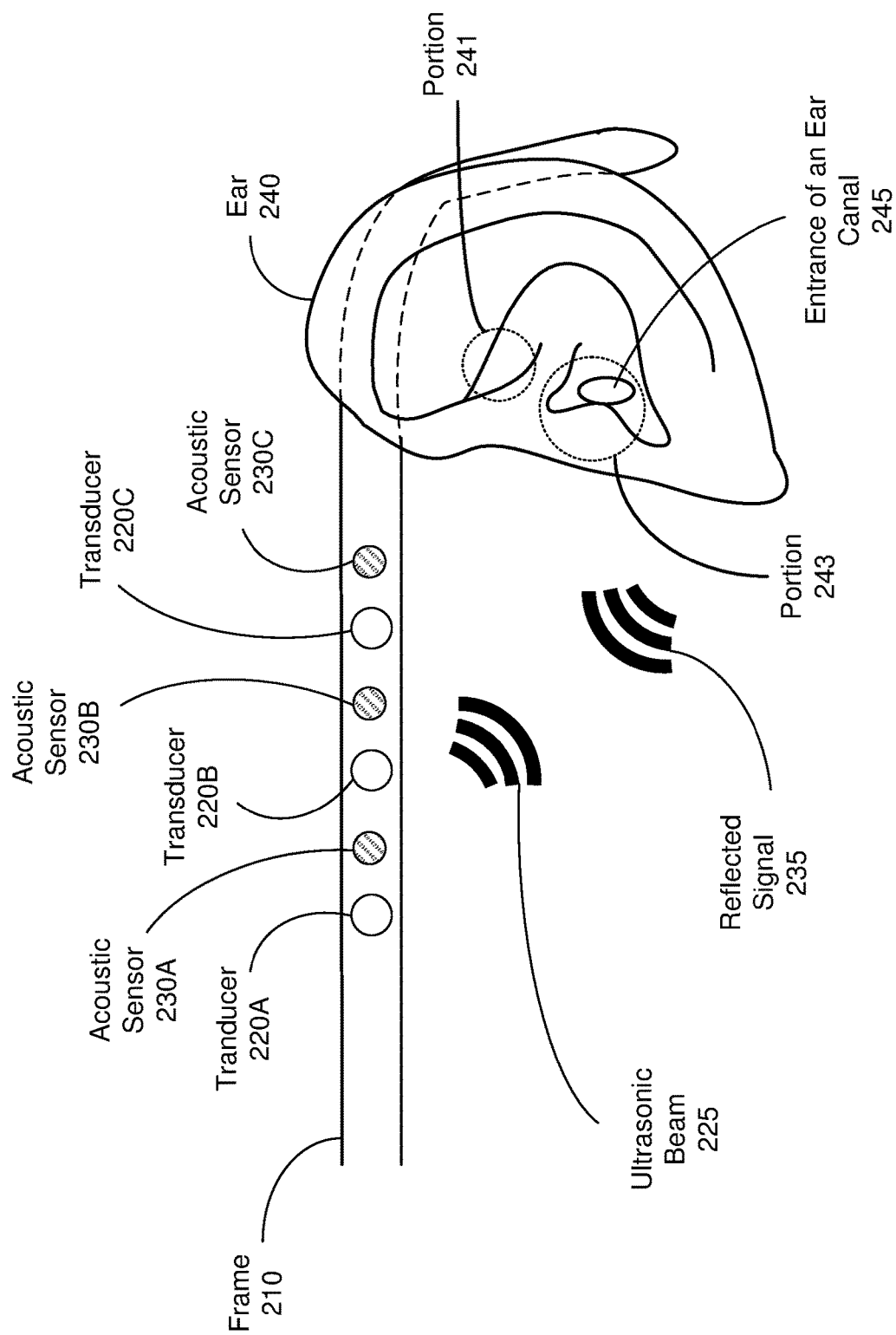
FIG. 2 is a side view of a portion of a headset, in accordance with one or more embodiments.

FIG. 2 is a side view of a portion of a headset, in accordance with one or more embodiments. The headset has an eyewear form factor similar to the headset 100. The portion depicted in FIG. 2 is a side view of a surface of an end piece of the headset. The surface faces away from the head of the user wearing the headset. The portion includes a frame 210, a plurality of transducers 220 (e.g., a transducer 220A, a transducer 220B, and a transducer 220C), and a plurality of acoustic sensors 230 (e.g., an acoustic sensor 230A, an acoustic sensor 230B, and an acoustic sensor 230C). The transducers 220 are embodiments of the transducers 160. In some embodiments (not shown), the plurality of transducers 220 may include at least one transducer positioned internal to the frame of the headset. The at least one transducer emits sound that propagates through a waveguide internal to the headset and is emitted out at least a port (an aperture) to a local area surrounding the headset. The acoustic sensors 230 are embodiments of the acoustic sensors 170.

In FIG. 2, a user is wearing the headset with the frame 210 resting on an ear 240 of the user. While FIG. 2 illustrates the components of the headset in example locations on the frame 210, the components may be located elsewhere on the headset. For example, a plurality of transducers 220 and a plurality of acoustic sensors 230 may be positioned on the other end piece of the headset. In some embodiments, some or all of the plurality of transducers 220 and/or some or all of the plurality of acoustic sensors 230 may be oriented (angled) on the end piece(s) to be pointed towards the ear(s) of the user. There may be more or fewer components on the headset than what is shown in FIG. 2.

In FIG. 2, two portions of the ear 240 are called out (e.g., a portion 241 and a portion 243). These portions are examples of areas of the ear 240 that include two types of surfaces: obstructing surfaces of the ear 240 and obstructed surfaces of the ear 240. The obstructing surfaces cause certain obstructed surfaces to not be in a line-of-sight of the plurality of transducers 220. Additionally or alternatively, the obstructing surfaces cause certain obstructed surfaces to not be in a line-of-sight of one or more imaging devices (e.g., the one or more imaging devices 130) that are capturing images of the ear 240.

The portion 241 includes a concha cymba (obstructed surface) surrounded by an inferior crus of the antihelix (obstructing surface) and a crus helix (obstructing surface). The portion 243 includes a concha cavum (obstructed surface) and an entrance of an ear canal 245 that leads into the interior of the ear canal (obstructed surfaces) surrounded by a tragus (obstructing surface) and the crus helix (obstructing surface).

In FIG. 2, the plurality of transducers 220 are configured to emit sound based on instructions received from an audio controller (e.g., the audio controller 150). The sound emitted may be one or more ultrasonic beams 225, one or more sub-ultrasonic beams, audio content, or any combination thereof. An ultrasonic beam 225 is a high frequency sound signal (e.g., a sound signal above 20 kHz or a sound signal in between 20 kHz and 40 kHz). The ultrasonic beam 225 may be output by a transducer (e.g., the transducer 220A), by a subset of the plurality of transducers 220 (e.g., the transducer 220A and the transducer 220B), or by all of the transducers in the plurality of transducers 220 (e.g., the transducer 220A, the transducer 220B, and the transducer 220C). In embodiments where a subset or all of the transducers 220 output sound, the plurality of transducers 220 may operate as a phased array such that the ultrasonic and/or sub-ultrasonic beams are directionalized (beamformed). For example, the plurality of transducers 220 may directionalize an ultrasonic beam 225 to interact with a specific portion of the ear of the user (e.g., portion 241). In another example, the plurality of transducers 220 may directionalize the ultrasonic beam(s) to ensonify (or interact with) several portions of the ear. The phased array may be positioned on a single chip.

The plurality of transducers 220 may transmit a sub-ultrasonic beam (not shown) towards the ear 240 of the user based on instructions received from the audio controller. A sub-ultrasonic beam is a sound signal with a frequency below the frequency of the ultrasonic beam 225. For example, a sub-ultrasonic frequency may be a frequency below 20 kHz. The sub-ultrasonic beam may be output by any or all of the transducers 220 in a similar manner to the ultrasonic beam 225. The sub-ultrasonic beam is effective in interacting with and penetrating into certain parts of the ear 240, such as an entrance of an ear canal 245 due to the sub-ultrasonic beam including lower frequency waves. The lower frequency waves diffract more than higher frequency waves, thereby allowing them to bend to some degree around obstructing surfaces (e.g., surfaces of a tragus, a crus helix, etc.) such that the sub-ultrasonic beams can interact with obstructed surfaces. For example, the audio controller may instruct the plurality of transducers 220 to transmit a sub-ultrasonic beam towards portion 241 of the ear in order to obtain geometric information about the concha cymba which is obstructed by the inferior crus of the antihelix and the crus helix.

The plurality of transducers 220 may present audio content to the user based on instructions received from the audio controller. The plurality of transducers 220 may present audio content that is based in part on a head-related transfer function (HRTF) associated with the user as determined by the audio controller.

In some embodiments, the plurality of transducers 220 may present sound that is time multiplexed. For example, at a first time, any or all of the plurality of transducers 220 may transmit the ultrasonic beam 225 and/or the sub-ultrasonic beam and, at a different time, any or all of the plurality of transducers 220 may present audio content to the user. In alternative embodiments, a subset of the plurality of transducers 220 may transmit the ultrasonic beam 225 and/or the sub-ultrasonic beam and a different subset of the plurality of transducers 220 may present audio content to the user at a same time. For example, the transducer 220A and the transducer 220B may transmit the ultrasonic beam 225 and the transducer 220C may present audio content simultaneously.

In some embodiments (not shown), the plurality of transducers 220 includes the functionality of the acoustic sensors 230, and the headset would not include separate acoustic sensors. For example, the plurality of transducers 220 is configured to transmit the ultrasonic beam 225 (and/or sub-ultrasonic beam) and detect a reflected signal 235. The reflected signal 235 is generated by an interaction of the beam with a surface of the ear 240. The plurality of acoustic sensors 230 are configured to detect sound. The plurality of acoustic sensors 230 may detect the reflected signal 235, sounds emitted by one or more sound sources in a local area of the headset, or a combination thereof. Each acoustic sensor detects sound and converts the detected sound into a format (e.g., an electronic format, a digital format, etc.) that may be provided to the audio controller, a server, a console, or another external system for further processing.

The plurality of transducers 220 and the plurality of acoustic sensors 230 may perform a stationary scan of the ear 240 of the user in accordance with instructions from the audio controller. During a stationary scan, the plurality of transducers 220 transmit an ultrasonic beam 225 and/or a sub-ultrasonic beam towards the ear 240 by ensonifying one or more portions of the ear 240. The headset remains stationary relative to the head of the user throughout the scan. For example, the headset may be worn by the user during a stationary scan. In another example, the headset may be held away from the user at a single position. The plurality of transducers 220 may transmit the ultrasonic beam 225 and/or the sub-ultrasonic beam in a sweeping fashion, a clicking fashion, or another suitable fashion that modulates the frequencies of the beam. For example, the plurality of transducers 220 may transmit the ultrasonic beam 225 in the sweeping fashion by outputting a sound signal in which the frequency increases or decreases logarithmically with time (e.g., over a time duration of 1-2 milliseconds). The sweeping fashion may result in the reflected signal containing distinctive times of arrival for each frequency provided in the sweep. In another example, the plurality of transducers 220 may transmit the ultrasonic beam 225 in the clicking fashion by outputting a sound signal in which all or substantially all frequencies are output at a same time. The clicking fashion may result in the reflected signal containing broadband reflected frequencies that are separated in the time domain. The plurality of acoustic sensors 230 detect the reflected signal 235 in a similar manner as described above. In some embodiments, the headset is capturing one or more images of the ear 240 concurrent to detecting the reflected signal 235.

The plurality of transducers 220 and the plurality of acoustic sensors 230 may perform a moving scan of the ear 240 of the user. During a moving scan, the user may remove the headset and position it such that the plurality of transducers 220 and the plurality of acoustic sensors 230 are directed towards the user from a plurality of different positions while ensonifying one or more portions of the ear 240. For example, the user (or some other party) can position the headset in different locations relative to the head of the user, such that the plurality of transducers 220 transmits an the ultrasonic beam 225 and/or a sub-ultrasonic beam towards various portions of the head of the user including the ear of the user and the plurality of acoustic sensors 230 detect the reflected signal 235 from the interaction of the ultrasonic beam 225 and/or sub-ultrasonic beam and the various portions of the user. The moving scan allows for the ultrasonic beams 225 and/or sub-ultrasonic beams to be directed at different portions of the ear 240 (e.g., from the anterior to the tragus to behind the pinna) and into the entrance of the ear canal 245. Additionally, the user (or some other party) may hold the headset at different angles and/or distances relative to the user. For example, the user may hold the headset at a distance shorter than arm's length with the plurality of transducers 220 and the plurality of acoustic sensors 230 pointed towards a side of the user's head during a moving scan. By holding the headset at different angles, the ultrasonic and/or sub-ultrasonic beams may interact with portions of a backside of the ear, with portions behind the tragus, etc. In some embodiments, the plurality of transducers 220 and the plurality of acoustic sensors 230 are positioned to detect a reflected signal 235 for a left ear of the user during a first moving scan and a right ear of the user during a second moving scan. In some embodiments, the headset is capturing one or more images of the ear 240 concurrent to detecting the reflected signal 235 during the moving scan.

The reflected signals 235 detected by the plurality of acoustic sensors 230 are based on interactions with various portions of the ear 240 of the user. For example, the various portions of the ear 240 may include a surface of the outer ear, such as a surface of the tragus, antitragus, concha, fossa, helix, antihelix fold, antihelix, scapha, etc., a surface of the ear canal, and/or a surface of the tympanic membrane. In some embodiments, the ultrasonic beam 225 and/or sub-ultrasonic beam may interact with a surface of the head of the user, a surface of a shoulder of the user, a surface of a neck of the user, etc. As such, the reflected signals 235 may also be based on interactions with the head, shoulder, and/or neck of the user.

The reflected signals 235 are provided to a controller of the audio system for further processing. For example, the audio controller may determine a detailed 3D geometry of the ear of the user based on the reflected signals 235. The 3D geometry may include outer ear geometry (e.g., a size, shape, depth, and contour structure of outer ear portions), a partial or full head shape, a location of the ear on the head, a location of the ear relative to the shoulder, ear canal geometry (e.g., a length and width of the ear canal), a geometry of a tympanic membrane (e.g., an angle of the tympanic membrane). In some embodiments, the reflected signals 235 may be used by the audio controller to update a 3D geometry of the ear. For example, a 3D geometry of the ear based on one or more captured images of the ear and/or depth information about the ear may include one or more deficiencies, and these deficiencies may be updated by the audio controller with information included in the 3D geometry of the ear based on the reflected signals 235 as discussed below in connection with FIG. 3.

Figure 3:
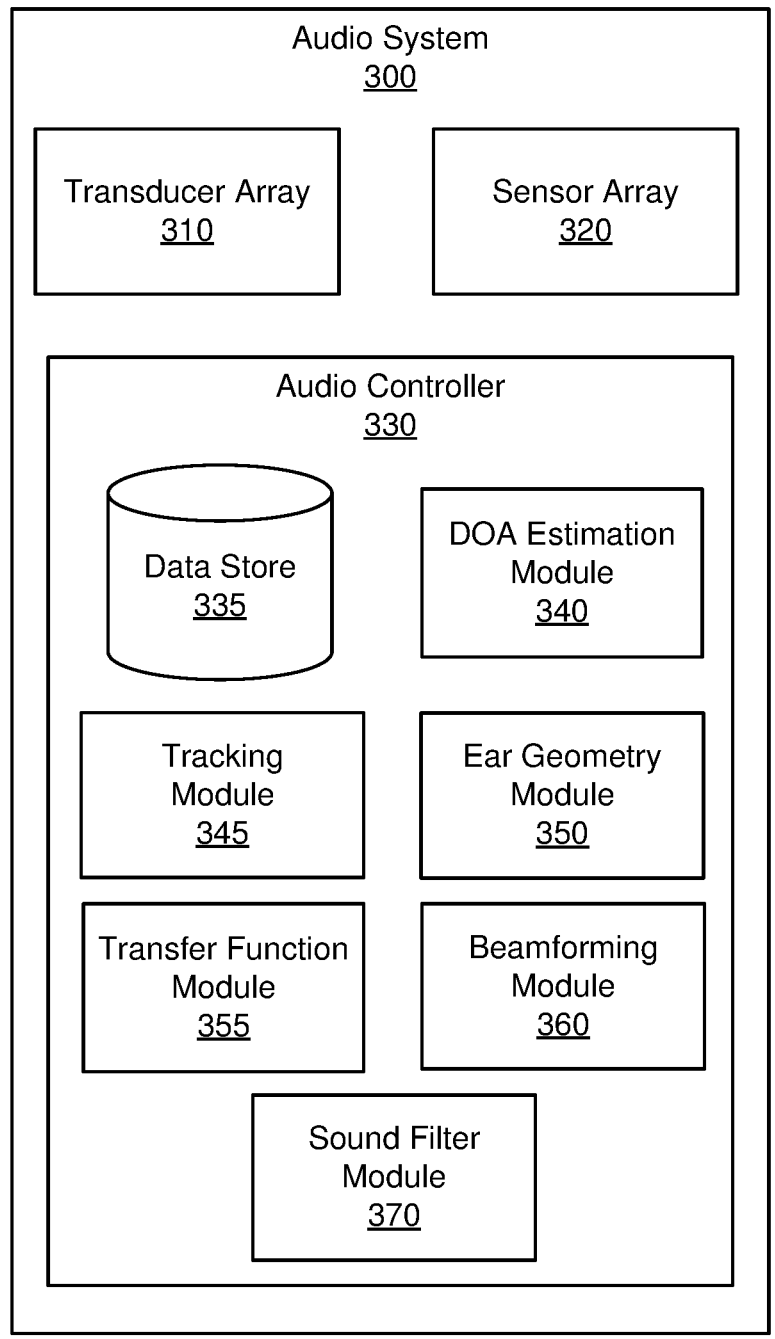
FIG. 3 is a block diagram of an audio system, in accordance with one or more embodiments.

FIG. 3 is a block diagram of an audio system 300, in accordance with one or more embodiments. The audio system in FIG. 1A or FIG. 1B may be an embodiment of the audio system 300. The audio system 300 generates one or more acoustic transfer functions (e.g., head-related transfer functions (HRTFs)) for a user. The audio system 300 may then use the one or more HRTFs to generate audio content for the user. In the embodiment of FIG. 3, the audio system 300 includes a transducer array 310, a sensor array 320, and an audio controller 330. Some embodiments of the audio system 300 have different components than those described here. Similarly, in some cases, functions can be distributed among the components in a different manner than is described here.

The transducer array 310 is configured to transmit sound (e.g., one or more ultrasonic beams) towards an ear of the user. The transducer array 310 includes a plurality of transducers (e.g., the transducers 160). In some embodiments, the plurality of transducers may cover a surface of a headset (e.g., headset 100 and/or headset 105) facing away from and/or facing towards the head of the user wearing the headset. For example, as described in FIG. 2, the plurality of transducers may cover a surface of each end piece of a frame of the headset that faces away from the head of the user. In some embodiments, the surface may be any other portion of the frame or any portion of a band (e.g., the band 175). For example, the plurality of transducers may cover a top surface of the frame and/or a bottom surface of the frame.

A transducer is a device that can emit an ultrasonic beam (e.g., a signal above 20 kHz), a sub-ultrasonic beam (e.g., a signal below 20 kHz), audio content, or some combination thereof. In some embodiments, the plurality of transducers of the transducer array 310 may be configured to transmit the ultrasonic and/or sub-ultrasonic beams at a first time and detect reflected signals from interactions of the ultrasonic and/or sub-ultrasonic beams with the ear at a second time. In some embodiments, the transducers may time multiplex audio content with the ultrasonic and/or sub-ultrasonic beams. For example, providing the audio content at a first time and the ultrasonic and/or sub-ultrasonic beams at a second time. Additional details regarding the operation of the transducer array 310 is discussed above in connection with FIGS. 1A and 2.

The transducer array 310 generates audio content in accordance with instructions from the audio controller 330. In some embodiments, the audio content is spatialized based on a HRTF associated with the user. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 300.

The sensor array 320 is configured to detect sounds within a local area surrounding the sensor array 320. The sensor array 320 may include a plurality of acoustic sensors that each detect air pressure variations of a sound wave and convert the detected sounds into an electronic format (analog or digital). The plurality of acoustic sensors (e.g., the acoustic sensors 170) may be positioned on a headset (e.g., headset 100 and/or the headset 105). For example, as described in FIG. 2, the acoustic sensors may be positioned along any surface of a frame of the headset. An acoustic sensor may be, e.g., a microphone, a vibration sensor, an accelerometer, or any combination thereof. In some embodiments, the sensor array 320 detects reflected signals corresponding to interactions of the ultrasonic and/or sub-ultrasonic beams with the ear of the user. For example, an ultrasonic beam output by a transducer reflects off the ear of the user and is detected by a microphone of the sensor array 320. In some embodiments, the sensor array 320 is configured to monitor the audio content generated by the transducer array 310 using at least some of the plurality of acoustic sensors. Increasing the number of sensors may improve the accuracy of information (e.g., directionality, depth, location) describing a sound field produced by the transducer array 310 and/or another sound from the local area. Additional details regarding the operation of the sensor array 320 is discussed above in connection with FIGS. 1A and 2.

The audio controller 330 controls operation of the audio system 300. In the embodiment of FIG. 3, the audio controller 330 includes a data store 335, a DOA estimation module 340, a tracking module 345, an ear geometry module 350, a transfer function module 355, a beamforming module 360, and a sound filter module 370. The audio controller 330 may be located inside a headset (e.g., headset 100 and/or headset 105), in some embodiments. Some embodiments of the audio controller 330 have different components than those described here. Similarly, functions can be distributed among the components in different manners than described here. For example, some functions of the controller may be performed external to the headset (e.g., by a console). The user may opt in to allow the audio controller 330 to transmit data captured by the headset to systems external to the headset, and the user may select privacy settings controlling access to any such data.

The data store 335 stores data for use by the audio system 300. Data in the data store 335 may include reflected signals, a template geometry of each ear of multiple users, 3D geometries of each ear, confidence levels for areas of the 3D geometries of the ears, threshold confidence levels, a machine learning model for updating the 3D geometries of the ears, one or more images of the user (e.g., images of portions of the user including a head, an ear, a shoulder, etc.), depth information about the user (e.g., depth information about an ear), sounds recorded in the local area of the audio system 300, audio content, HRTFs, other transfer functions for one or more sensors, array transfer functions (ATFs) for one or more of the acoustic sensors, sound source locations, virtual model of local area, direction of arrival estimates, sound filters (e.g., a customized equalization filter for the user), and other data relevant for use by the audio system 300, or any combination thereof.

The DOA estimation module 340 is configured to localize sound sources in the local area based in part on information from the sensor array 320. Localization is a process of determining where sound sources are located relative to the user of the audio system 300. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some cases, the DOA analysis may include any suitable algorithm for analyzing a surrounding acoustic environment in which the audio system 300 is located.

For example, the DOA analysis may be designed to receive input signals from the sensor array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine DOA.

In some embodiments, the DOA estimation module 340 may also determine the DOA with respect to an absolute position of the audio system 300 within the local area. The position of the sensor array 320 may be received from an external system (e.g., some other component of a headset, an artificial reality console, a mapping server, a position sensor (e.g., the position sensor 180), etc.). The external system may create a virtual model of the local area, in which the local area and the position of the audio system 300 are mapped. The received position information may include a location and/or an orientation of some or all of the audio system 300 (e.g., of the sensor array 320). The DOA estimation module 340 may update the estimated DOA based on the received position information.

The tracking module 345 is configured to track locations of one or more sound sources. The tracking module 345 may compare current DOA estimates and compare them with a stored history of previous DOA estimates. In some embodiments, the audio system 300 may recalculate DOA estimates on a periodic schedule, such as once per second, or once per millisecond. The tracking module may compare the current DOA estimates with previous DOA estimates, and in response to a change in a DOA estimate for a sound source, the tracking module 345 may determine that the sound source moved. In some embodiments, the tracking module 345 may detect a change in location based on visual information received from the headset or some other external source. The tracking module 345 may track the movement of one or more sound sources over time. The tracking module 345 may store values for a number of sound sources and a location of each sound source at each point in time. In response to a change in a value of the number or locations of the sound sources, the tracking module 345 may determine that a sound source moved. The tracking module 345 may calculate an estimate of the localization variance. The localization variance may be used as a confidence level for each determination of a change in movement.

The ear geometry module 350 is configured to determine a 3D geometry of an ear of the user. A 3D geometry of the ear is a 3D model of the ear. For example, a 3D geometry may include a 3D geometric mesh, 3D parametric manifolds, or another customized 3D representation of the ear. The ear geometry module 350 may determine the 3D geometry of the ear based on a template model of an ear, one or more images of the ear, depth information about the ear, or the reflected signal(s). In embodiments where the ear geometry module 350 uses a template model to generate the 3D geometry, the ear geometry module 350 may receive the template model of the ear from a system external to the audio system 300 (e.g., a console, a database, etc.). The template model may be based on one or more characteristics of the user. For example, the user may input characteristics, such as age, gender, height, weight, etc. into a console communicatively coupled to the audio system 300 and the template model of an ear that corresponds to the characteristics is provided by the console to the ear geometry module 350.

The ear geometry module 350 may determine the 3D geometry of the ear based on one or more images of the ear. For example, the one or more images may be captured by one or more imaging devices of the headset (e.g., the imaging devices 130) and/or by one or more imaging devices of a separate electronic device (e.g., a smartphone, a laptop, etc.). The one or more captured images include images of various portions of the user's head (including the ear of the user). The captured images are analyzed by the headset and/or the console utilizing known imaging processing techniques (e.g., using known computer vision software) to determine the 3D geometry of the ear.

The ear geometry module 350 may determine the 3D geometry of the ear based on depth information as determined by a depth camera assembly (DCA) of the headset. For example, the depth information may include a depth map of the head of the user and/or of the ear of the user. The depth map may include geometric information such as positioning, distances, orientation, etc. of certain features of the head and/or ear. The ear geometry module 350 may utilize the depth map to determine the 3D geometry of the ear.

The ear geometry module 350 may determine the 3D geometry of the ear based on the reflected signal(s) detected by the sensor array 320 and/or the transducer array 310. The ear geometry module 350 analyzes the reflected signal(s) to determine a surface geometry of the outer ear, a surface geometry of the ear canal, and/or a surface geometry of the tympanic membrane. The ear geometry module 350 determines the surface geometries by determining a time delay between the transmittal of the ultrasonic and/or sub-ultrasonic beam by the transducer array 310 and the detection of the reflected signal. For example, the ear geometry module 350 may determine a detailed surface geometry of the outer ear (e.g., a size, shape, depth, and contour structure of outer portions), a partial or full head shape, a location of the ear on the head, a detailed internal geometry of the ear canal (e.g., a length and width of the ear canal), and/or a geometry of a tympanic membrane (e.g., an angle of the tympanic membrane) based on the reflected signal.

The ear geometry module 350 may determine to update a determined 3D geometry of the ear based on one or more areas of the 3D geometry having a low confidence. In some embodiments, the ear geometry module 350 may determine a confidence for each area of the 3D geometry. For example, the ear geometry module 350 may divide the 3D geometry up into a defined number of unique areas (e.g., into a grid) and determine the confidence of each area. In another example, the 3D geometry of the ear may have one or more predefined regions (e.g., inside of pinna, inside of ear canal, inside of concha, etc.) and each predefined region may include one or more areas. The ear geometry module 350 determines a confidence for each area of each region. The confidence may be a numerical value (e.g., an integer, a decimal, a percent, etc.) representing the relative certainty of geometric accuracy of the area. The confidence may be based on an amount of spatial (geometric) information about the ear at that particular area, a signal-to-noise ratio of that particular area, and/or an amount of variation between multiple geometric estimates for that particular area. For example, the ear geometry module 350 may assign a confidence, such as 90%, to an area due to the area having a low signal-to-noise ratio. In embodiments where the 3D geometry is a 3D geometric mesh, the confidence may be based on a precision in location of vertices and/or keypoints of the 3D geometry and/or a precision in connectivity of the vertices and/or keypoints. In embodiments where the 3D geometry is a 3D parametric manifold, the confidence may be based on a certainty (or uncertainty) of the parameters of a parameterized surface (e.g., certainty in coefficients of a manifold expressed using a coordinate system).

The ear geometry module 350 determines areas of low confidence by comparing the confidence of each area with a threshold confidence value. In some embodiments, each area of the ear has an associated threshold confidence value. In some embodiments, each predefined region of the ear has an associated threshold confidence value. For example, regions within the ear may be associated with a higher confidence threshold value and regions around the outside of (surrounding) the ear may be associated with a lower confidence threshold value. In some embodiments, a single confidence threshold value is used for all areas of the 3D geometry. Based on an area of the 3D geometry having a confidence below the threshold confidence value, the ear geometry module 350 may update that area with geometric information about the ear based on one or more images, depth information, reflected signal(s), or some combination thereof.

In order to update area(s) of low confidence, the ear geometry module 355 may provide instructions to the one or more imaging devices, the DCA, and/or the transducer array 310 to conduct a stationary scan and/or a moving scan as discussed above in more detail in connection with FIGS. 1A and 2. For example, in embodiments where the 3D geometry of the ear is based on one or more images and/or depth information, the ear geometry module 350 may provide instructions to the transducer array 310 to perform a moving scan of the ear using ultrasonic beams to ensonify the ear. In this same example, the ear geometry module 350 may determine a second 3D geometry of the ear based on the reflected signal(s) detected based on the scan. The one or more areas of low confidence may be augmented with the corresponding one or more areas of the second 3D geometry of the ear. In another example, the ear geometry module 350 may provide instructions to the transducer array 310 to perform a stationary scan of the ear using sub-ultrasonic beams to ensonify the ear. In this same example, the ear geometry module 350 may determine a second 3D geometry of the ear based on the reflected signal(s) detected based on the scan and augment any areas of low confidence in the 3D geometry with corresponding areas in the second 3D geometry.

Prior to augmenting the 3D geometry with a second 3D geometry, the ear geometry module 350 may first determine a confidence for each of the corresponding areas of the second 3D geometry and compare the confidence values to the confidence threshold values. If a corresponding area in the second 3D geometry satisfies the confidence threshold values, the ear geometry module 350 augments the area of the 3D geometry with the area in the second 3D geometry. The updated 3D geometry is more personalized to the user.

The ear geometry module 350 may determine a first 3D geometry of the ear based on one or more images and/or depth information and a second 3D geometry of the ear based on the reflected signal(s). The ear geometry module 350 may update the 3D geometry of the ear by inputting the first 3D geometry and the second 3D geometry into a machine learning model. The machine learning model may utilize various machine learning techniques, such as linear support vector machine (linear SVM), boosting for other algorithms (e.g., AdaBoost), neural networks, logistic regression, naïve Bayes, memory-based learning, random forests, bagged trees, decision trees, boosted trees, boosted stumps, nearest neighbors, k nearest neighbors, kernel machines, probabilistic models, conditional random fields, Markov random fields, manifold learning, generalized linear models, generalized index models, kernel regression, or Bayesian regression in different embodiment. The machine learning model may be trained using historical data including 3D geometries of an ear determined based on one or more images, 3D geometries of an ear determined based on the reflected signal, 3D geometries of an ear determined based on depth information, known high-quality, accurate 3D models of an ear, some other 3D representation of an ear, or some combination thereof. The machine learning model may determine which portions of the first 3D geometry and which portions of the second 3D geometry are to be used to determine the updated 3D geometry of the ear.

The transfer function module 355 is configured to generate one or more acoustic transfer functions. Generally, a transfer function is a mathematical function giving a corresponding output value for each possible input value. The acoustic transfer functions may be array transfer functions (ATFs), head-related transfer functions (HRTFs), other types of acoustic transfer functions, or some combination thereof. Based on the updated 3D geometry of the ear, the transfer function module 355 generates one or more HRTFs that are personalized to the user of the audio system 300.

The transfer function module 355 determines a personalized HRTF for a user of the audio system 300 based on the 3D geometry of the ear as determined by the ear geometry module 350. The personalized HRTF characterizes how the ear receives a sound from a point in space. The HRTF for a particular source location relative to a person is unique to each ear of the person (and is unique to the person) due to the person's anatomy (e.g., ear geometry, head shape, shoulders, etc.) that affects the sound as it travels to the person's ears. In some embodiments, the transfer function module 355 may determine HRTFs for the user using a calibration process. In some embodiments, the transfer function module 355 may provide information about the user to a remote system (e.g., a console, a server, a database, etc.). The user may adjust privacy settings to allow or prevent the transfer function module 355 from providing the information to any remote systems. In some embodiments, the remote system may determine the personalized HRTF for the user using, e.g., machine learning, and provide the customized HRTF to the audio system 300.

The transfer function module 355 may determine an ATF that characterizes how a microphone receives a sound from a point in space. An ATF includes a number of transfer functions that characterize a relationship between the sound source and the corresponding sound received by the acoustic sensors in the sensor array 320. Accordingly, for a sound source there is a corresponding transfer function for each of the acoustic sensors in the sensor array 320. And collectively the set of transfer functions is referred to as an ATF. Accordingly, for each sound source there is a corresponding ATF. Note that the sound source may be, e.g., someone or something generating sound in the local area, the user, or one or more transducers of the transducer array 310. The ATF for a particular sound source location relative to the sensor array 320 may differ from user to user due to a person's anatomy (e.g., ear shape, shoulders, etc.) that affects the sound as it travels to the person's ears. Accordingly, the ATFs of the sensor array 320 are personalized for each user of the audio system 300.

The beamforming module 360 is configured to process one or more ATFs to selectively emphasize sounds from sound sources within a certain area while de-emphasizing sounds from other areas. In analyzing sounds detected by the sensor array 320, the beamforming module 360 may combine information from different acoustic sensors to emphasize sound associated from a particular region of the local area while deemphasizing sound that is from outside of the region. The beamforming module 360 may isolate an audio signal associated with sound from a particular sound source from other sound sources in the local area based on, e.g., different DOA estimates from the DOA estimation module 340 and the tracking module 345. The beamforming module 360 may thus selectively analyze discrete sound sources in the local area. In some embodiments, the beamforming module 360 may enhance a signal from a sound source. For example, the beamforming module 360 may apply sound filters which eliminate signals above, below, or between certain frequencies. Signal enhancement acts to enhance sounds associated with a given identified sound source relative to other sounds detected by the sensor array 320.

The sound filter module 370 determines sound filters for the transducer array 310. In some embodiments, the sound filters cause the audio content to be spatialized, such that the audio content appears to originate from a target region. The sound filter module 370 may use the personalized HRTF and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 370 calculates one or more of the acoustic parameters. In some embodiments, the sound filter module 370 requests the acoustic parameters from a mapping server (e.g., as described below with regard to FIG. 5).

The sound filter module 370 may determine an equalization filter for the transducer array 310 that is customized to the user. In some embodiments, the sound filter module 370 generates the equalization filter based on the updated 3D geometry as determined by the ear geometry module 350. For example, the sound filter module 370 may input the 3D geometry into a model (e.g., a machine learning model) that is configured to predict how the audio content will sound at the ear of the user (e.g., the model outputs a predicted response). Based on a difference between a target response (as determined by a content creator) and the predicted response, the sound filter module 370 generates the equalization filter.

The equalization filter adjusts one or more acoustic parameters of the audio content (e.g., wavelength, frequency, volume, pitch, balance, etc.) based on the 3D geometry of the ear of the user to generate the target response at the ear of the user so that the user perceives the audio content as the content creator of the audio content intended it to be heard. The equalization filter may be a high pass filter, a low pass filter, a parametric individualized equalization filter, a graphic equalization filter, or any other suitable type of individualized equalization filter. In some embodiments, the sound filter module 370 selects an equalization filter from a group of existing equalization filters, adjusts parameters of an existing equalization filter, generates a new equalization filter, or adjusts an equalization filter previously generated by the sound filter module 370 based on the predicted response at the ear of the user.

The sound filter module 370 provides the sound filters including the customized equalization filter to the transducer array 310. In some embodiments, the sound filters may cause positive or negative amplification of sounds as a function of frequency. The customized equalization filter may adjust one or more acoustic parameters of the audio content (e.g., wavelength, frequency, volume, pitch, balance, etc.).

FIG. 4 is a flowchart illustrating a process 400 for determining a head-related transfer function (HRTF) for a user, in accordance with one or more embodiments. The process shown in FIG. 4 may be performed by components of an audio system (e.g., audio system 300). Other entities may perform some or all of the steps in FIG. 4 in other embodiments. Embodiments may include different and/or additional steps or perform the steps in different orders.

The audio system transmits 410 an ultrasonic beam towards an ear of the user of a headset. In some embodiments, a plurality of transducers of the audio system output a high-frequency sound signal (e.g., the ultrasonic beam) towards the ear of the user. The audio system may provide instructions to the plurality of transducers to output the ultrasonic beam based on the audio system determining that a three-dimensional (3D) geometry of the ear includes a low confidence area. Additionally or alternatively, the plurality of transducers output a sound signal with a frequency below the ultrasonic (e.g., a sub-ultrasonic beam) towards the ear of the user. The audio system may provide instructions to the plurality of transducers to output the sub-ultrasonic beam based on the audio system determining that a 3D geometry of the ear includes a low confidence area that includes an obstructed surface of the ear.

The audio system detects 420 a reflected signal generated by an interaction of the ultrasonic beam with the ear. In some embodiments, one or more acoustic sensors (e.g., one or more microphones) of the audio system may detect the reflected signal. The one or more acoustic sensors may convert the reflected signal into a format (e.g., an electronic format, a digital format, etc.) and provide the information to a controller of the audio system.

In some embodiments, the audio system may transmit the ultrasonic and/or sub-ultrasonic beam and detect the reflected signal using a stationary scan technique. For example, a positioning of the plurality of transducers and the one or more acoustic sensors remain stationary during the transmission and detection. In some embodiments, the audio system may transmit the ultrasonic and/or sub-ultrasonic beam and detect the reflected signal using a moving scan technique. For example, a positioning of the plurality of transducers and the one or more acoustic sensors is adjusted during the transmission and detection.

The audio system updates a 3D geometry of the ear based on the reflected signal. In some embodiments, the audio system may determine a 3D geometry of the ear based on one or more captured images of the ear, depth information about the ear, and/or the reflected signal(s). The audio system may determine to the update the 3D geometry of the ear based on one or more areas of the 3D geometry having a low confidence. The audio system updates the 3D geometry based on the reflected signal. For example, the audio system determines a second 3D geometry of the ear based on the reflected signal and determines a confidence of each corresponding area(s) of the second 3D geometry. Areas of the second geometry with a high confidence replace corresponding low confidence areas of the 3D geometry. In some embodiments, the audio system determines a first 3D geometry of the ear based on one or more images and/or depth information and a second 3D geometry based on the reflected signal. The first and second 3D geometries may be input into a machine learning model to update the 3D geometry of the ear.

The audio system determines a head-related transfer function (HRTF) for the user based in part on the 3D geometry of the ear. The HRTF is personalized for the user as the HRTF corresponds to both a geometry of the outer surface of the outer ear and a geometry of the surfaces of the ear in between the outer ear and the middle ear.

This method creates a virtual audio environment that is more realistic for the user based on the personalized HRTF. Conventional methodologies used to determine a HRTF for the user are error-prone as the determined HRTF are based on generalized information about the user and/or captured images of the user. Neither methodology is based on a true geometry of the user's ear that includes the geometry of both the outer ear and the geometry of the ear between the outer ear and the middle ear. By using a reflected signal to update a 3D geometry of the ear, contours and other morphology of the outer ear are determined and a structure of portions of the ear between the outer ear and the middle ear (obstructed in captured images) is determined. By utilizing the current transducers (speakers) and acoustic sensors (microphones) on the headset to transmit and receive the ultrasonic and/or sub-ultrasonic sound, a highly accurate HRTF for the user of the headset can be determined.

Figure 5:
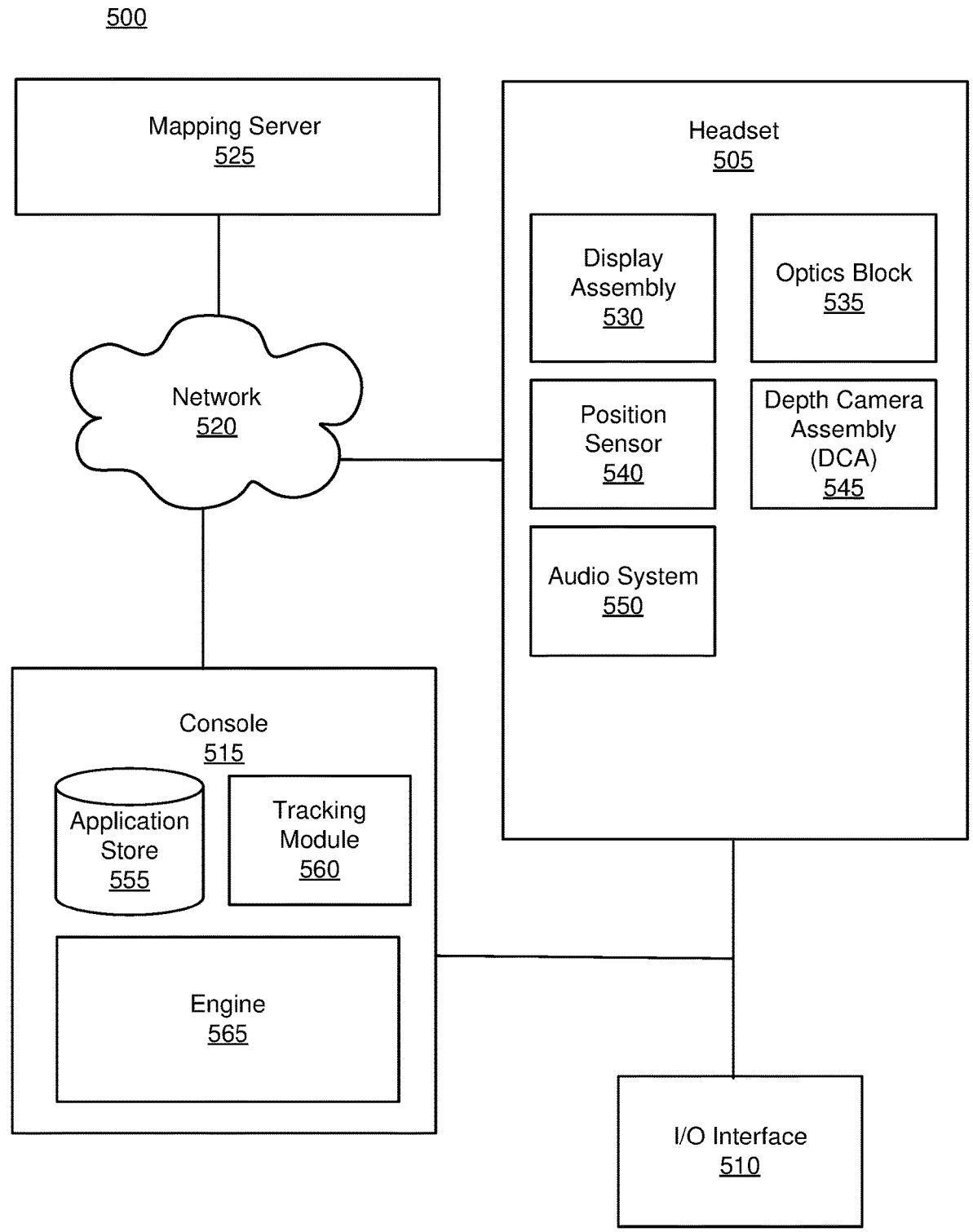
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, a depth camera assembly (DCA) 545, and an audio system 550. Some embodiments of headset 505 have different components than those described in conjunction with FIG. 5. Additionally, the functionality provided by various components described in conjunction with FIG. 5 may be differently distributed among the components of the headset 505 in other embodiments or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 180 is an embodiment of the position sensor 540. Examples of a position sensor 540 include: one or more IMUs, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. The DCA 545 may generate depth information for a portion of a head of the user including at least an ear of the user. Operation and structure of the DCA 545 is described above with regard to FIG. 1A.

The audio system 550 provides audio content to a user of the headset 505. The audio system 550 is substantially the same as the audio system 300 describe above. The audio system 550 may comprise a plurality of transducers, one or more acoustic sensors, and an audio controller. The audio system 550 can emit sound (e.g., an ultrasonic beam) via the plurality of transducers. The audio system 550 can detect sound (e.g., a reflected signal) via the plurality of acoustic sensors. The audio system 550 can process the reflected signal to update a three-dimensional (3D) geometry of the ear of the user based on the reflected signal. The audio system 550 may utilize the 3D geometry of the ear to determine a head-related transfer function (HRTF) that is personalized for the user of the headset 505. The audio system 550 may provide spatialized audio content to the user based on the determined HRTF.

In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may receive information describing at least a portion of the local area from e.g., the DCA 545 and/or location information for the headset 505 from the position sensor 540. The audio system 550 may generate one or more sound filters using the determine HRTF and/or the one or more acoustic parameters received from the mapping server 525 and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   transmitting an ultrasonic beam towards an ear of a user of a headset;
   detecting a reflected signal generated by an interaction of the ultrasonic beam with the ear;
   obtaining a three-dimensional geometry of the ear of the user;
   updating, by a controller, the three-dimensional geometry of the ear based on the reflected signal; and
   determining, by the controller, a head-related transfer function (HRTF) for the user based in part on the three-dimensional geometry of the ear.

2. The method of claim 1, wherein transmitting the ultrasonic beam towards the ear comprises:
   beamforming outputs of a plurality of speakers on the headset to create and directionalize the ultrasonic beam, the plurality of speakers forming a phased array.

3. The method of claim 1, wherein the reflected signal is generated by the interaction of the ultrasonic beam with an obstructed portion of the ear.

4. The method of claim 1, wherein the three-dimensional geometry of the ear was previously generated using one or more images of the ear, and the updated three-dimensional geometry of the ear includes information corresponding to an obstructed portion of the ear included in the one or more images.

5. The method of claim 4, wherein updating the three-dimensional geometry of the ear comprises:
   identifying an area of low confidence in the three-dimensional geometry of the ear that was generated using the one or more images of the ear;
   identifying a corresponding area in a second three-dimensional geometry of the ear that was generated using the reflected signal;
   determining a confidence level for the corresponding area; and
   based on the confidence level for the corresponding area being higher than a threshold confidence level, augmenting the area of low confidence in the three-dimensional geometry of the ear with the corresponding area.

6. The method of claim 1, further comprising:
   determining, by the controller, an equalization filter for the user based in part on the three-dimensional geometry of the ear.

7. The method of claim 1, further comprising:
   transmitting a sub-ultrasonic beam towards the ear;
   detecting a second reflected signal generated by an interaction of the sub-ultrasonic beam with the ear; and
   updating, by the controller, the three-dimensional geometry of the ear based on the second reflected signal, the updated three-dimensional geometry of the ear to include information about an obstructed portion of the ear.

8. The method of claim 7, wherein the ultrasonic beam and the sub-ultrasonic beam are transmitted concurrently towards the ear.

9. The method of claim 1, further comprising:
   identifying an area of low confidence in the three-dimensional geometry of the ear;
   identifying a corresponding area in a second three-dimensional geometry of the ear that was generated using one or more images;
   determining a confidence level for the corresponding area; and
   based on the confidence level for the corresponding area being higher than a threshold confidence level, augmenting the area of low confidence in the three-dimensional geometry of the ear with the corresponding area in the second three-dimensional geometry of the ear.

10. The method of claim 9, wherein the second three-dimensional geometry of the ear based on the one or more images is determined by a server, the server communicatively coupled to the headset.

11. The method of claim 1, wherein: obtaining the three-dimensional geometry of the ear of the user comprises determining a first three-dimensional geometry of the ear based on one or more images; and
   updating the three-dimensional geometry of the ear comprises:
      determining a second three-dimensional geometry of the ear based on the reflected signal; and
      inputting the first three-dimensional geometry of the ear and the second three-dimensional geometry of the ear into a machine learning model, the machine learning model trained to update the three-dimensional geometry of the ear based on both the first three-dimensional geometry of the ear and the second three-dimensional geometry of the ear.

12. An audio system comprising:
a plurality of transducers, the plurality of transducers configured to transmit an ultrasonic beam towards an ear of a user;
one or more acoustic sensors, the one or more acoustic sensors configured to detect a reflected signal generated by an interaction of the ultrasonic beam with the ear; and
a controller configured to:
   obtaining a three-dimensional geometry of the ear of the user;
   update the three-dimensional geometry of the ear based on the reflected signal; and
   determine a head-related transfer function (HRTF) for the user based in part on the three-dimensional geometry of the ear.

13. The audio system of claim 12, wherein the plurality of transducers includes a speaker with a port, and wherein the speaker is coupled to the port via an acoustic waveguide.

14. The audio system of claim 12, wherein the plurality of transducers forms a phased array and is further configured to beamform outputs to create and directionalize the ultrasonic beam.

15. The audio system of claim 14, wherein the phased array is on a single chip.

16. The audio system of claim 12, wherein the plurality of transducers is further configured to present audio content to the user based in part on the determined HRTF.

17. The audio system of claim 16, wherein, at a same time, a subset of the plurality of transducers is configured to present audio content and a different subset of the plurality of transducers is configured to transmit the ultrasonic beam.

18. The audio system of claim 12, wherein the plurality of transducers is further configured to transmit a sub-ultrasonic beam towards the ear, the one or more acoustic sensors is further configured to detect a second reflected signal generated by an interaction of the sub-ultrasonic beam with the ear, and the controller is further configured to update the three-dimensional geometry of the ear based on the second reflected signal, the updated three-dimensional geometry of the ear to include information about an obstructed portion of the ear.

19. The audio system of claim 12, wherein the audio system is integrated into a headset worn by the user.

20. A non-transitory computer readable medium storing instructions that, when executed by a processor, cause the processor to perform steps comprising:
transmitting an ultrasonic beam towards an ear of a user of a headset;
detecting a reflected signal generated by an interaction of the ultrasonic beam with the ear;
obtaining a three-dimensional geometry of the ear of the user;
updating the three-dimensional geometry of the ear based on the reflected signal; and
determining a head-related transfer function (HRTF) for the user based in part on the three-dimensional geometry of the ear.

* * * * *